United States Patent [19]
Mertens

[11] Patent Number: 5,557,282
[45] Date of Patent: Sep. 17, 1996

[54] HEIGHT FINDING ANTENNA APPARATUS AND METHOD OF OPERATION

[75] Inventor: Donald E. Mertens, Thousand Oaks, Calif.

[73] Assignee: ITT Corporation, New York, N.Y.

[21] Appl. No.: 255,917

[22] Filed: Oct. 11, 1988

[51] Int. Cl.⁶ ................................................ G01S 13/08
[52] U.S. Cl. ................................ 342/123; 342/140
[58] Field of Search .................................. 342/140, 147, 342/123; 343/771

[56] References Cited

U.S. PATENT DOCUMENTS

| | | | |
|---|---|---|---|
| 3,106,708 | 10/1963 | Sletten | 342/140 |
| 3,277,470 | 10/1966 | Page | 342/140 |

*Primary Examiner*—Mark Hellner

*Attorney, Agent, or Firm*—Thomas N. Twomey; Patrick M. Hogan

[57] ABSTRACT

A ground based radar antenna system and method for determining the elevation angle $\phi$ of a tracked target having a shaped reflector and a pair of spaced feedhorns for transmitting radiated energy to and receiving returned signals from the tracked target T, the shaped reflector and feedhorns cooperating to increase the range of coverage of the elevation angle $\phi$ beyond the coverage previously available with a standard parabolic reflector and to increase the gain of the signals returned to the ground based radar antenna system while simultaneously eliminating elevation angle ambiguities over prior systems employing only feedhorns for collecting returned signals. The radar system includes a construction which approximates a cosecant-squared antenna pattern, permits the calculation of the target height and three-dimensional position, and is economical to manufacture.

17 Claims, 4 Drawing Sheets

HEIGHT FINDING ANTENNA APPARATUS AND METHOD OF OPERATION

BACKGROUND OF THE INVENTION

This invention relates to ground based radar antenna systems for use in tracking targets, and more particularly, to a new and improved dual beam ground based radar antenna system and method having a pair of feed horns and a reflector for determining the height of a tracked target.

In the field of electronic tracking devices, the use of ground based radar antennas have long been recognized as an effective way to determine the range and bearing of a tracked target. Such ground based radar antenna installations are commonly found along the boarders and coastlines and on the military reservations of modern industrialized nations.

Because of the continued military and industrial development of high altitude supersonic aircraft, radar antenna installations of the past are faced with a continuing difficulty of determining the altitude and three-dimensional position of an aircraft. In particular, when applied from a ground based radar installation, the basic measurement required for determining height is the elevation angle of the aircraft. In order to properly track the aircraft, the height of the target must be known. Generally, once the elevation angle of the target is known, the height or altitude of the target is derived from the elevation angle by trigonometric formulas.

General concepts of the radar technology may be gleaned from a handbook entitled INTRODUCTION TO RADAR SYSTEMS authored by Merrill I. Skolnik, copyrighted 1962 edition by McGraw-Hill Book Company. Two of the basic beam patterns that exist are the pencil beam and the fan beam. The pencil beam may be generated with a metallic reflector surface shaped in the form of a paraboloid of revolution with the electromagnetic energy fed from a point source placed at the focus. Although a narrow beam can search a large sector or even a hemisphere, it is not always desirable because operational requirements place a restriction on the maximum scan time. The maximum scan time is defined as the time for the pencil beam to return to the same point in space. Therefore, the radar beam cannot dwell too long in any one radar location. This is especially true if there is a large number of locations to be searched. The number of locations to be searched can be materially reduced if the narrow pencil beam radar antenna is replaced by a beam in which one dimension is narrow while the other dimension is broad such as a fan-shaped pattern.

One method of generating a fan beam is with a parabolic reflector shaped to yield the proper ratio between the azimuth and elevation beamwidths. Many long range ground based search radar antennas use a fan beam pattern that is narrow in azimuth and broad in elevation. When ground based search radar antennas employing fan beams are used against aircraft targets, no resolution in elevation is obtained. Therefore, no height information is available.

One method of achieving elevation angle information for targets located by a fan beam search radar antenna is to employ an additional fan beam radar antenna with the narrow dimension in elevation instead of azimuth, as in the common height finding radar antenna. In this method, again the height finding radar antenna actually measures elevation angle rather than height. Because the number of locations that the fan beam radar antenna must search is considerably less than the number that the pencil beam radar antenna must search, the fan beam radar antenna can dwell longer in each location so that more return signals per target can be obtained. The rate at which a fan beam antenna may be scanned is a compromise between the rate at which target position information is desired (data rate) and the ability to detect weak targets (probably of detection). Note that the two are at odds with one another and the more slowly the radar antenna scans, the more pulses will be available for integration and the better the detection capability. On the other hand, a slow scan rate means a longer time between the detection of the same target.

The simple fan beam antenna is usually inadequate for targets at high altitudes close to the radar antenna, because the fan beam antenna radiates very little energy in the high altitude direction close to the radar antenna. It is possible to modify the antenna pattern to radiate more energy at higher angles. One such technique for accomplishing high angle detection employs an antenna fan beam with a shape proportional to the square of the cosecant of the elevation angle.

In the cosecant-squared antenna, the gain is a function of the elevation angle and it should be noted that cosecant squared antennas apply to airborne search radar antennas observing ground targets as well as ground base radar antennas observing airborne targets. The cosecant-squared antenna may be generated by a distorted section of a parabola or by a true parabola with a properly designed set of multiple feed horns. The pattern may also be generated with an array-type antenna.

The cosecant-squared antenna has the important property that the echo power received from a target of constant cross-section at constant altitude is independent of the targets range from the radar. In theory, the mathematics illustrate that the echo power is independent of the range for the constant altitude target. However in practice, the power received from an antenna with a cosecant-squared pattern is not truely independent of range because of the simplifying assumptions made. It should be noted, that the crosssection of the target varies with the viewing aspect, the earth is not flat, and the radiation pattern of any real antenna can be made to only approximate the desired cosecant-squared pattern. For preliminary design purposes, it may be assumed that a search radar antenna having a pattern proportional to $csc^2 \phi$, where $\phi$ is the elevation angle, produces a constant echo-signal power for a target flying at constant altitude if certain assumptions are satisfied. Fan beam search radar antennas generally employ this type of pattern.

The design of a cosecant-squared antenna pattern is an application of synthesis techniques which are generally found in the prior art literature. The cosecant-squared pattern may be approximated with a reflector antenna by shaping the surface or by using more than one feed horn. The pattern produced in this manner may not be as accurate as might be produced by a well-designed antenna array, but operationally, it is not necessary to approximate the cosecant-squared pattern very percisely. A common method of producing the cosecant-squared pattern employs a shaped reflector. The upper half of the reflector is a parabola and reflects energy from the feed horn in a direction parallel to the axis as is known in the art. The lower half of the reflector, however, is distorted from the parabolic contour so as to direct a portion of the energy in the upward direction.

A cosecant-squared antenna pattern can also be produced by feeding the parabola reflector with two or more feed horns or alternatively, by employing a linear array. If the feed horns are separated and fed properly, the combination of the secondary beams will give a smooth cosecant-squared pattern over some range of angle. A reasonable approximation to the cosecant-squared pattern has been obtained by employing two feed horns while a single feed horn combined with a properly located ground plane has been utilized to generate the pattern.

An example of a height finding system of the past that employed a pencil beam antenna was comprised of a rotator-type antenna or an array-type antenna each of which provided focus to the antenna beam. In the rotator-type antenna, the pencil beam is scanned in elevation as it is rotated. The angle of the pencil beam at the instant the signal is returned is labelled the elevation angle which is a necessary element for determining the height of the tracked target. Once the return beam is received, the elevation angle is measured for calculating the height of the tracked target.

There are many applications in which a knowledge of target height may not be necessary. An obvious example is where the target is known to lie on the surface of the earth, and its position is determined by range and azimuth. However, there are many instances in which a knowledge of the target's position in three dimensions is essential. The elevation angle can be used as the third position coordinate, but it is often more convenient to use height. Height may be derived from the measurement of range and elevation angle. The use of height, instead of the elevation angle from which it is derived, is more desirable in those applications where it is apt to be less variant than the elevation angle. This is usually true for aircraft targets or for satellites with nearly circular orbits.

Three-dimensional position information can be obtained with a symmetrical pencil-beam antenna. Both the azimuth and the elevation angle can be determined from a single observation with a single radar antenna. The pencil beam might search a hemispherical volume in space by rapidly nodding in elevation and slowly rotating in azimuth, or alternatively, the beam could rotate in azimuth while elevating slowly to trace out a helical-scan pattern. The chief disadvantage of a radar antenna with a pencil beam is that it usually requires a relatively long time to cover the volume of interest. The search time depends on the number of hits to be obtained from each target. The greater the number of hits per scan, the more accurate will be the angle measurement. The time $t_s$ required to scan an antenna of azimuth beamwidth $\theta_B$ and elevation beamwidth $\phi_B$ over a total azimuth angle $\theta_t$ and a total elevation angle $\phi_t$ when "n" pulses are to be received from each f resolution cell (with a pulse repetition frequency $f_r$) is $$t_s = \frac{n\phi_t\theta_t}{f_r\phi_B\theta_B} \quad (1)$$

Consider a 2° pencil beam that is to search a volume 360° in azimuth and 60° in elevation at a pulse repetition frequency of 1,000 Hz. If the scanning fluctuations are to be attenuated by 30 dB, at least 38 pulses must be processed per angular resolution cell. Substituting these values into equation (1) results in a frame time of 4.05 minutes. A 600-knot aircraft could fly 40.5 nautical miles in this time, which is a relatively long distance between observations. If three hits per scan were satisfactory, the frame time would be 0.27 minutes and the same aircraft would travel 2.7 nautical miles between observations. The pencil beam will generally be directed at targets above the ground clutter.

The rotation of the pencil beam in azimuth may be mechanical, as in conventional ground-based search radar systems. A rapid nodding scan is often used in elevation and may also be performed mechanically by moving the entire antenna. Alternatively, the parabolic torus with an organpipe scanner, or the planar array, or a linear array feeding a parabolic cylinder might also be used to scan the beam. The linear array could be electronically scanned in elevation and mechanically scanned in azimuth. Frequency scanning is a convenient form of electronic scanning for this application if the necessary bandwidth is available.

Elevation information may be obtained by stacking a number of narrow pencil beams in elevation and noting which beam contains the echo. Each of the stacked beams feeds an independent receiver. A separate transmitter might be used for each beam, or alternatively, a separate broad-coverage transmitting beam could illuminate the volume common to all narrow receiving beams. The overlapping pencil beams may be generated with a single reflector antenna fed by a number of horns—one for each beam. The beams may also be generated with an array antenna whose elements are combined to form a number of overlapping beams. By interpolating the voltages between adjacent beams of the stacked-beam configuration, it is possible to obtain a more precise measurement of the elevation angle than can be obtained with a single stationary pencil beam.

In many radar applications the fan beam is used to search the required volume. Even though the broad beamwidth of the fan beam in elevation does not permit the measurement of the elevation angle to any degree of precision, it is possible, in some cases, to obtain a rough approximation of target height. One technique makes use of the phenomenon whereby, under cetain circumstances, the pattern of a broad fan beam is broken into many smaller lobes by interference between the direct wave and the wave reflected from the surface of the earth. "Lobing" is more likely to occur at the lower radar frequencies and when the beam is located over water or other good reflecting surfaces. If the interference lobe pattern of the antenna is known—either by calculation or by calibration, using a known aircraft target—the range at which a target is first detected by the radar antenna is a measure of target height. The path of the target can be followed through the lobe pattern to obtain confirmation of the height. This technique is not too satisfactory since it offers but a crude estimate of height; it is not too reliable; it depends upon too many uncontrollable factors such as the propagation conditions; and it requires as a priori knowledge of the radar cross section of the target.

Another technique for measuring elevation angle or height includes the use of two antennas mounted one above the other. The elevation angle is measured by comparing the phase differences in the antennas as in an interferometer. Elevation angle can also be measured by generating two overlapping elevation fan beams with a single reflector as in the amplitude-comparison monopulse radar. The sum and difference signals are used just as in the monopulse tracking radar, except that the angle-error voltage does not control a servo loop but is used directly as a measure of the elevation angle.

The usual method of obtaining both azimuth-and elevation-angle measurements involves two separate fan-beam radar antennas. One of the two radar antennas is a vertical fan beam—narrow beam in azimuth angle, broad in elevation angle—rotating in azimuth to measure the range and azimuth. This is the conventional search radar antenna. A separate radar with a horizontal fan beam—narrow in elevation angle, broad in azimuth angle—is used to measure elevation. This is called a height finder. The range and azimuth obtained with the search radar antenna can be used to position the height finder in azimuth. The height finder searches for the target by scanning in elevation. Upon acquiring a target at the same range as indicated by the search radar antenna, it proceeds to nod about the target at a rapid rate to accurately determine the center of the beam. The search radar antenna and the height-finder radar antenna may be operated at two separate locations, or they may be mounted back-to-back on the same pedestal.

Another height-finding technique employed in the past is the V-beam radar antenna. This consists of two fan beams, one vertical and the other tilted at some angle to the vertical. The separation between the vertical beam and the slant beam may be 45°. The time between observations of the same target in the two beams depends upon the target range and height. It can be shown that the height "h" of a target at a range R is $$h = \frac{R \sin \Delta\omega}{(1 + \sin^2 \Delta\omega)^{1/2}} \quad (2)$$

where $\Delta\omega$=azimuth rotation between beams=$\omega_s \, t_h$ $\omega_s$=azimuth rotation rate, rps, and $t_h$=time between observations, sec Although an angle of 45° may exist between the vertical and the slant beam, there is some advantage in making the angle smaller if the radar must operate with a high traffic density. The larger the number of targets, the more difficult is the problem of correlating the echoes from the two beams. The closer the beams, the easier it is to correlate the echoes.

As the beam is scanned in elevation, the elevation angle may be measured directly by a mechanical system. Since the pencil beam is always orthogonal to the radar antenna transmitter, the elevation angle can be measured as with a protractor-type measuring device assembled directly to the rotator-type antenna or with a synchro-servo measuring system. However, in a phased array radar antenna system, the pencil beam may be scanned in elevation by electronic phase shifters for achieving a rapid scan rate and for measuring the elevation angle. This type of system is employed when the data rate is important in tracking and is usually dependent upon the dynamics of the target. The main problem associated with the phased array pencil beam radar antenna is that in order to determine the target height by state-of-the-art methods, the system becomes very expensive to develop.

Certain radar systems of the past are based on a comparison of the amplitudes of echo signals received from two or more antenna positions. Some systems such as the sequential-lobing and the conical-scan techinques use a single, time-shared antenna beam while other monopulse techniques use two or more simultaneous beams. The difference in amplitudes in the several antenna positions is proportional to the angular error. The elevation angle may also be determined by comparing the phase difference between the signals of two separate antennas. Unlike the antennas of amplitude-comparison trackers, the antennas employed in phase-comparison systems are not offset from the axis. The individual boresight axes of the antennas are parallel, causing the radiation to illuminate the same volume of space. The amplitudes of the target echo signals are essentially the same from each antenna beam but the phases are different.

The measurement of the elevation angle by comparison of the phase relationships of the signals from the separated antennas of a radio interferometer is well known in the art and has been used as a passive instrument with the source of the energy being radiated by the target itself. A tracking radar antenna which operates with phase information is similar to an active interferometer and has been referred to as a phase-comparison monopulse or interferometer radar antenna.

Two receiving antennas are employed which are separated by a distance "d". Mathematical concepts have been derived for determining the electrical phase angle between the feedhorns. The electrical phase angle is a function of the distance "d", the elevation angle and the wavelength of the received energy. It should be noted that for an antenna operating on the phase-comparison monopulse or interferometer radar antenna principles, the distance "d" is limited. Thus, for the interferometer radar antenna to be able to substantially monitor the total hemisphere, then the distance "d" must be less than or equal to one-half the wavelength of the received energy to avoid elevation angle ambiguities.

In the general case, the frequencies of interest are those from the X-band to the L-band. Thus, if the distance "d" is to satisfy the above constraint, then the two antennas must be small. This is because the sum of the distance between the center lines of the two antennas must be equal to or less than one-half the wavelength of the received energy to avoid elevation angle ambiguities. Since the wavelength of frequencies of the L-band are approximately two feet while the wavelengths of the frequencies of the X-band are in the range of from one inch to two inches, the two antennas of the interferometer radar must be small. Generally, the radar range equation dictates that the bigger the antenna, the greater the gain or electronic amplification of the received signal. The radar equation generally describes the power of the received return signal in terms of the power transmitted from the radar antenna, the gain at the transmitting antenna, the gain at the receiver antenna, the wavelength of the received energy, the radar cross-section and the range from the radar antenna to the target.

A major problem associated with the interferometer radar is that the receive aperture is too small and cannot adequately receive the signal reflected from the target. Thus, if the receive aperture is too small, the antenna receiver is generally ineffective for long distance reception. The pair of antennas could be made larger to boost the gain by using a parabolic reflector. Under these conditions, the distance "d" becomes larger through the main lobe region and the effective elevation angle is depressed resulting in a small elevation coverage. Consequently, the interferometer radar antenna can only measure the elevation of a target within a limited specified range. If the target were above a particular elevation angle, the radar antenna would not detect it.

Therefore, in the interferometer radar antenna, two potential conditions exist. The first condition is when the distance "d" is within a specified length providing a larger elevation coverage but a low gain of the received signal. The second condition exists when the two antennas are made larger resulting in a higher gain of the received signals but a small elevation coverage.

Hence, those concerned with the development and use of height finding dual beam antennas in the radar field have long recognized the need for improved radar antenna tracking systems which provide a shaped reflector combined with a closely spaced pair of feedhorns for including a greater elevation angle coverage than if the reflector was shaped as a standard parabola and for providing more amplification gain than if the feedhorns had been the only receiving elements while simultaneously eliminating elevation angle ambiguities. Further, the shaped reflector of the improved radar antenna system should achieve a cosecant-squared antenna pattern, permit the determination of the three-dimensional position of the target by the addition of the azimuth angle, and be economical to manufacture in comparison with prior systems and methods of height finding.

SUMMARY OF THE INVENTION

Briefly, and in general terms, the present invention provides a new and improved radar antenna construction having a shaped reflector which substantially increases the range of elevation angle coverage, and which significantly increases the received signal gain over similar types of prior art radar designs while simultaneously eliminating elevation angle ambiguities. Moreover, the radar construction of the present invention approximates a cosecant-squared antenna pattern, permits the calculation of the target height and three-dimensional position and is economical to manufacture compared to radar systems of the past.

Basically, the present invention is directed to an improved ground based radar system and method of operation for increasing the range of elevation angle coverage and for increasing the amplification of returned radar signals while simultaneously eliminating elevation angle ambiguities. This is accomplished by modifying the design of the radar system of the past by providing a shaped reflector and by adjusting the spacing of a pair of feedhorns.

In accordance with the invention, the returned signals are collected by the shaped reflector and directed to the respective feedhorns. The shape of the reflector substantially increases the range of elevation angle coverage over the range previously available from standard parabolic reflectors and significantly increases the received signal gain over the gain available if the feedhorns were the primary receiving elements. The feedhorns are separated by a few wavelengths of the received signal energy. Ambiguities in the elevation angle are avoided because the reflector restricts the elevation angle seen by the feedhorns and allows a region of space, typically 30°, to be translated into a much smaller angle to avoid the ambiguities. The smaller angle is then translated into two times 360° of electrical angle difference between the feedhorns even though the feedhorns may be spaced at a distance greater than $\lambda/2$ wavelengths.

In accordance with the improved method of the present invention, once the return signals are received, their amplitudes in decibels (dB) are compared and their phase difference is determined. The amplitudes in decibels (dB) are then plotted against the elevation angle on one graph having a pair of curves for matching to the number of feedhorns. Then, the electrical phase difference between the pair of curves is plotted against the elevation angle on a second graph. The character of the two curves relative to one another may be mapped into the phase difference curve for determining the electrical phase relationship between the return signals. Thus, knowing the electrical phase difference between the return signals, the elevation angle of a tracked target may be determined. Then, with knowledge of the elevation angle, the azimuth angle (from planar rotation) and the range of the target, the three-dimensional position of the target can then be calculated.

The new and improved ground based radar system and method of operation of the present invention substantially increases the range of elevation angle coverage over the range previously available from standard parabolic reflectors and further increases the received signal gain over similar types of prior art radar antenna designs in which the feedhorns were the primary receiving elements. This is accomplished while simultaneously eliminating elevation angle ambiguities. Further, the radar construction approximates a cosecant-squared antenna pattern, permits the calculation of the target height and three-dimensional position in space, and is economical to manufacture compared with other radar systems of the past. The method of operation described herein can also be adapted to existing radar systems.

These and other features and advantages of the invention will become apparent from the following more detailed description, when taken in conjunction with the accompanying drawings, which illustrate, by way of example, the features of the invention.

DETAILED DESCRIPTION OF THE PREFERRED EMBODIMENT

As shown in the drawings for purposes of illustration, the invention is embodied in a ground based radar system 100 of the type having a shaped reflector 102 for substantially increasing the range of elevation angle coverage for height determination of a target 104 and having a pair of spaced feedhorns 106, 108 for transmitting a signal to and receiving a returned signal from the target, the gain of the return signal being significantly increased while simultaneously eliminating elevation angle ambiguities.

Figure 1:
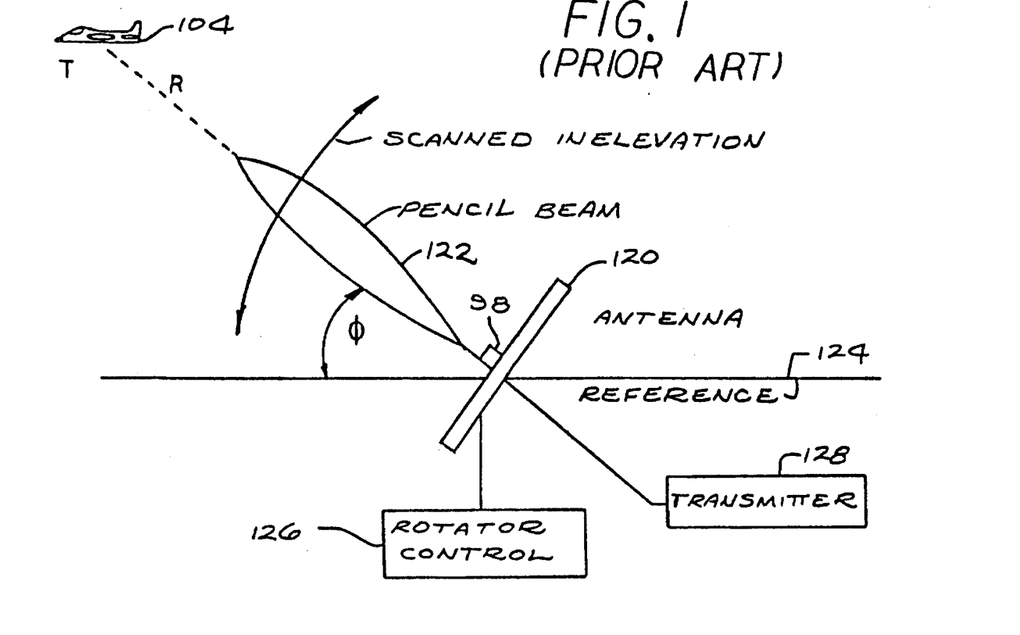
FIG. 1 is a side elevational view of a first three-dimensional radar system of the prior art.

In ground based radar systems known in the art, the basic parameter measurement required for determining the height of a tracked target is the elevation angle φ of the target. In order to properly track the target, the height must be known and once the elevation angle φ is determined, the height or altitude may be derived by trigonometric formulas. An example of a radar system of the past included a rotator type antenna 120 which provided focus to a pencil beam 122. In the rotator antenna, the pencil beam is scanned in elevation as it is rotated through 360° as shown in FIG. 1. The angle of the pencil beam at the instant a returned signal is received is identified as the elevation angle φ. The angle φ is a necessary element for determining the height of the tracked target. The rotator antenna 120 is driven in a circular and scanning motion by a rotator control 126.

The pencil beam 122 is shown scanning through a vertical arc while a transmitter 128 in communication with the antenna 120 is located a distance R from a target T. Typically, the target is an aircraft which passes through the scanned sector monitored by the rotator antenna 120. Once the transmitted beam is returned from the target T, the elevation angle φ may be measured for calculating the height of the target. As the beam is scanned in elevation, the angle φ may be measured directly by a mechanical system. Since the pencil beam 122 is normally orthogonal to the antenna 120, (but if not orthogonal, can be determined) the angle φ can be measured as with a protractor type measuring device assembled directly to the rotator type antenna. Further refinements to the antenna 120 for measuring the angle φ may employ a synchro-servo measuring system.

The rotator antenna 120 may also be a phased array type antenna which provides elevation scanning to the pencil beam 122. In the phased array antenna, electronic circuitry is employed which changes the electrical phase of the received signal energy from one array element to the next thereby scanning the pencil beam. The process is made possible by employing phase shifters (not shown) for effectively providing movement of the return signal through the circuitry.

Other systems have employed circuitry for changing the frequency of the transmitted and received signals for effecting the electrical phase across the array. A serpentine (not shown) is a device employed for changing the phase as a function of frequency of each of the signals directed to each of the antenna elements across the array.

The electronic radar systems such as the phased array employ the phase shifted receivers for achieving a rapid scan rate which is important in tracking the target T and is usually dependent upon the dynamics of the target. However, the main problem associated with the above described rotator type antennas is the expense associated with developing state-of-the-art methods for tracking the target height.

Figures 2, 3:
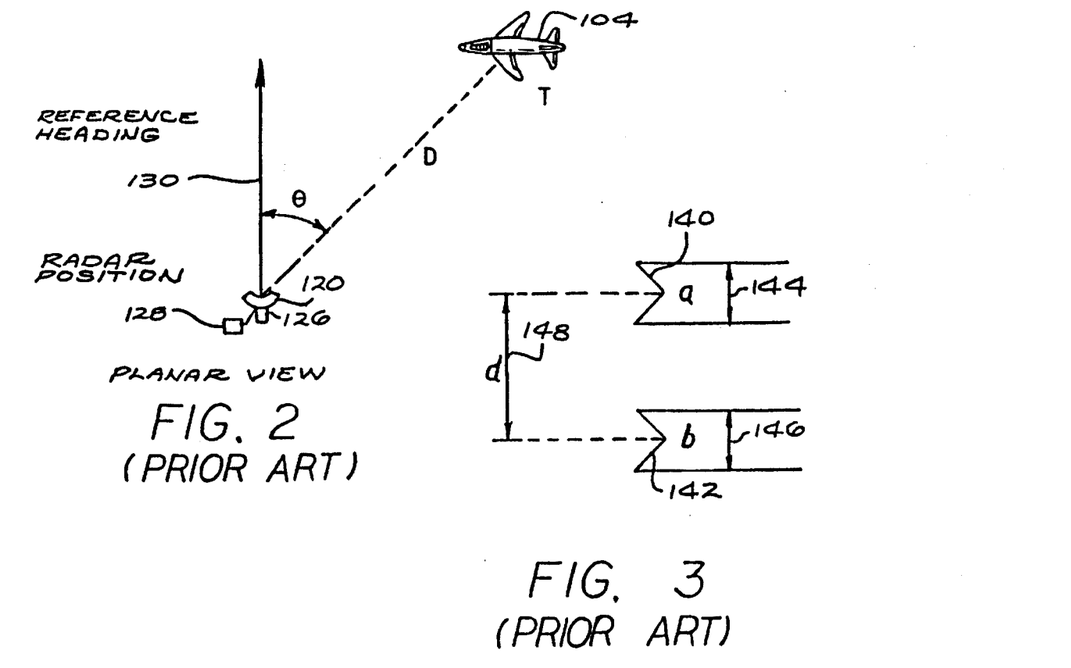
FIG. 2 is a planar view of the horizontal position of a target with respect to a fixed reference heading.
FIG. 3 is a planar view of a second three-dimensional radar system of the prior art.
Figure 6:
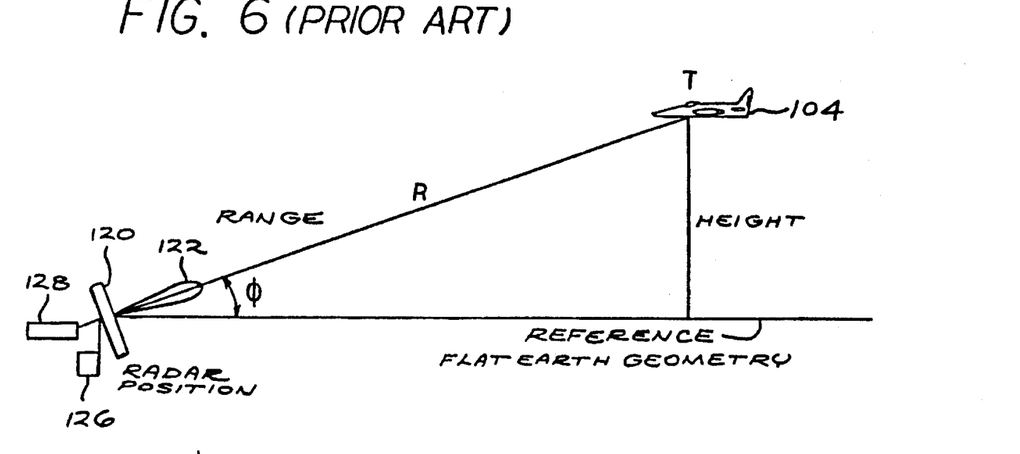
FIG. 6 is a side elevational view of a two-dimensional geometric construction of the prior art employed for determining the height of a tracked target.

Generally, once the elevation angle φ has been determined, the height of the tracked target may be calculated as shown in FIG. 6. The calculations may be made for either a flat earth geometry or a round earth geometry. Once the elevation angle and the range to the target T are known and a flat earth geometry is assumed, the height of the target may be found simply by employing the trigonometric sine function. Further, if a reference heading 130 is selected, then the azimuth angle θ may be utilized to determine the angular displacement of the target T from the reference heading 130. This measurement applies where the target T lies in a plane which is parallel to the plane of the reference heading as shown in FIG. 2. The distance from the antenna 120 to the orthogonal projection of the target T into the azimuth plane is D.

Figure 7:
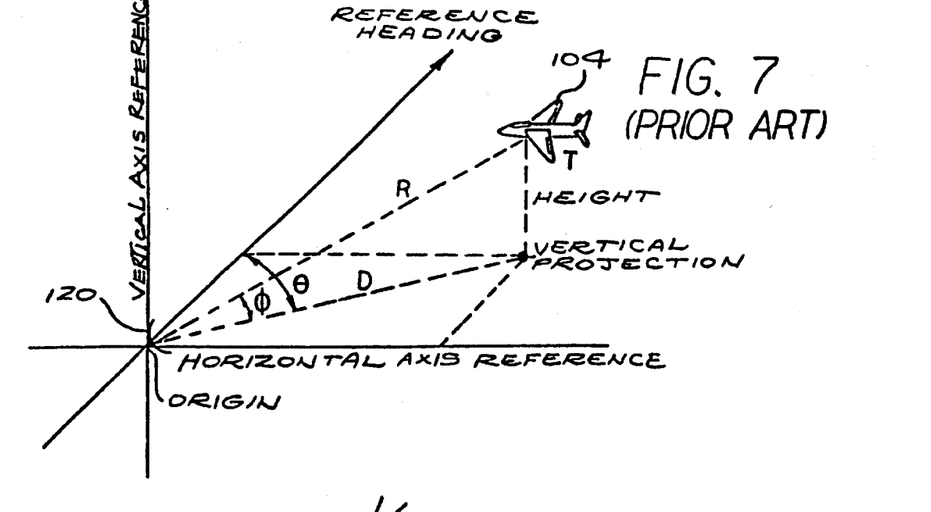
FIG. 7 is a view of a three-dimensional geometric construction of the prior art employed for determining the height of a tracked target.

A view illustrating the pencil beam antenna 120 located at the origin of a three-dimensional coordinate axis is shown in FIG. 7. The target 104 is located with respect to the reference heading 130 by employing the elevation angle φ, the azimuth angle θ, the planar distance D, and the range R. The vertical projection from the target to the ground plane is the height calculated by trigonometric functions.

The measurement of the elevation angle φ by comparison of the phase relationships of signals from a pair of first and second antennas 140, 142 of a radio interferometer is well known in the art. The radio interferometer has been used as a passive instrument with the source of the energy being radiated from the target T itself. A tracking radar antenna which operates with phase information is similar to an active interferometer and has been referred to as a phase comparison monopulse radar system.

The first antenna 140 has a dimension "a" designated by the distance 144 while the second antenna 142 has a dimension "b" designated by the distance 146. The first and second antennas are receiving antennas which are separated by a distance "d" designated by 148 as is shown in FIG. 3.

Mathematical concepts have been derived for determining the electrical phase angle between the feedhorns. Such a concept in equation form is $$\Delta e = \left( \frac{2\pi}{\lambda} \right) d \sin(\phi) \quad (3)$$

where λ is equal to the wavelength of the received energy, (d) is equal to the distance between the centers of the first and second antennas 140, 142, and Δe is equal to the electrical phase angle between the two adjacent feedhorns.

The electrical phase angle is a function of the distance "d" the elevation angle φ and the wavelength λ of the received energy. It should be noted that for an antenna operating on the phase comparison monopulse or interferometer radar principle, the distance "d" is limited. For the interferometer radar to be able to substantially monitor the total hemisphere without angle ambiguities, the distance "d" must be less than or equal to one-half the wavelength of the received energy.

However, the above limitation on the distance "d" is in direct conflict with the desire to achieve a large antenna gain. This problem is discussed later in the context of the radar range equation. The gain of a circular aperture antenna in equation form is:

$$G = Pa \left( \frac{\pi D}{\lambda} \right)^2 \quad (4)$$

where (λ) is the wavelength of the received energy, (D) is equal to the diameter of the circular aperture, (Pa) is the antenna aperture efficiency (a number less than unity), and (G) is the gain of the antenna.

Note that if two equal sized circular apertures were touching at their edges (e.g., immediately adjacent) then the distance between their centers (d) would be equal to their individual diameters (D). Also, note that the antenna gain (G) is proportional to the square of the diameter (D)-to-wavelength (λ) ratio. If the distance (d) between the antennas 140, 142 must be equal to or less than one-half the wavelength (λ), where for adjacent circular antennas (d=D), then the antenna gain in equation form would be:

$$G \leq Pa \left( \frac{\pi}{2} \right)^2. \quad (5)$$

For an aperture efficiency of (Pa)=1, the maximum possible gain is provided which is approximately 2 dB. This value is considered to be a low magnitude of gain.

Generally, the radar range equation dictates that the bigger the antenna, the greater the gain or electronic amplification of the received signal. Such an equation may be represented as:

$$P_r = \frac{P_t G_t G_r \lambda^2 \sigma}{(4\pi)^3 R^4} \quad (6)$$

The radar range equation generally describes the power of the received return signal ($P_r$) in terms of the power transmitted ($P_t$) from the radar system, the gain ($G_t$) at the transmitting antenna, the gain ($G_r$) at the receiver antenna, the wavelength squared ($\lambda^2$) of the received energy, the radar cross-section (σ) and the range to the fourth power ($R^4$) from the radar antenna to the target T.

A major problem associated with the interferometer radar is that the receive aperture (not shown) is too small and cannot adequately receive the signal reflected from the target T. Thus, if the receive aperture is too small, the first and second antennas 140 and 142 are generally ineffective for long distance reception. The pair of antennas 140, 142 could be made larger to boost the gain by using a pair of parabolic reflectors. However, under these conditions, the distance "d"

would become larger. As a result, the effective elevation angle $\phi$ is depressed resulting in a small elevation coverage. Consequently, the interferometer radar can only measure the elevation of a target T within a limited specified range. If the target were above the limited elevation angle range, the radar antenna would not detect the target T. Under these conditions, the electrical phase angle $\Delta e$ of equation (3) would not be accurate for measuring the phase difference between the antenna signals received.

Therefore, in the phase-comparison monopulse or interferometer radar system, two potential conditions exist. The first condition is when the distance "d" is within a specified length which will provide a larger elevation angle coverage but a low gain of the signal returned from the target T. The second condition exists when the first and second antennas 140, 142 are made larger resulting in a higher gain of the signals returned from the target T but with a corresponding smaller elevation angle coverage. A more detailed treatment of the phase-comparison monopulse radar technique can be found in the fig. 5.12 and the accompanying text of section 5.4, pages 181–182 of the INTRODUCTION OF RADAR SYSTEMS by Merrill I. Skolnik.

Figure 4:
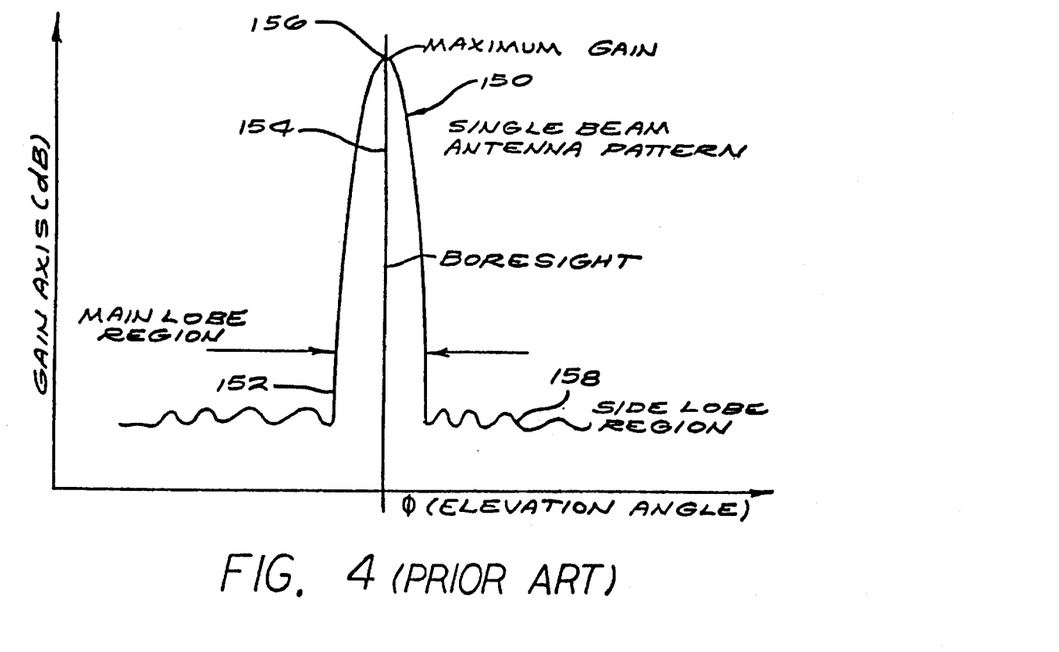
FIG. 4 is a graphical representation of a single beam antenna pattern of the prior art.

Generally, a plurality of antenna beam patterns have been developed in the past for tracking a target T. Examples of such patterns include a single beam antenna pattern 150 as is illustrated in FIG. 4. The antenna pattern 150 is graphically illustrated on a two dimensional graph having a vertical gain coordinate measured in decibels (dB) and a horizontal coordinate measuring the elevation angle $\phi$. The antenna pattern 150 illustrates a main lobe region 152 centered on the graph having a boresight 154 pass through a maximum gain point 156 located at the apex of the antenna pattern. Adjacent to the main lobe region is a side lobe region 158 illustrating returned signals having spatial frequencies of varying harmonics.

Figure 5:
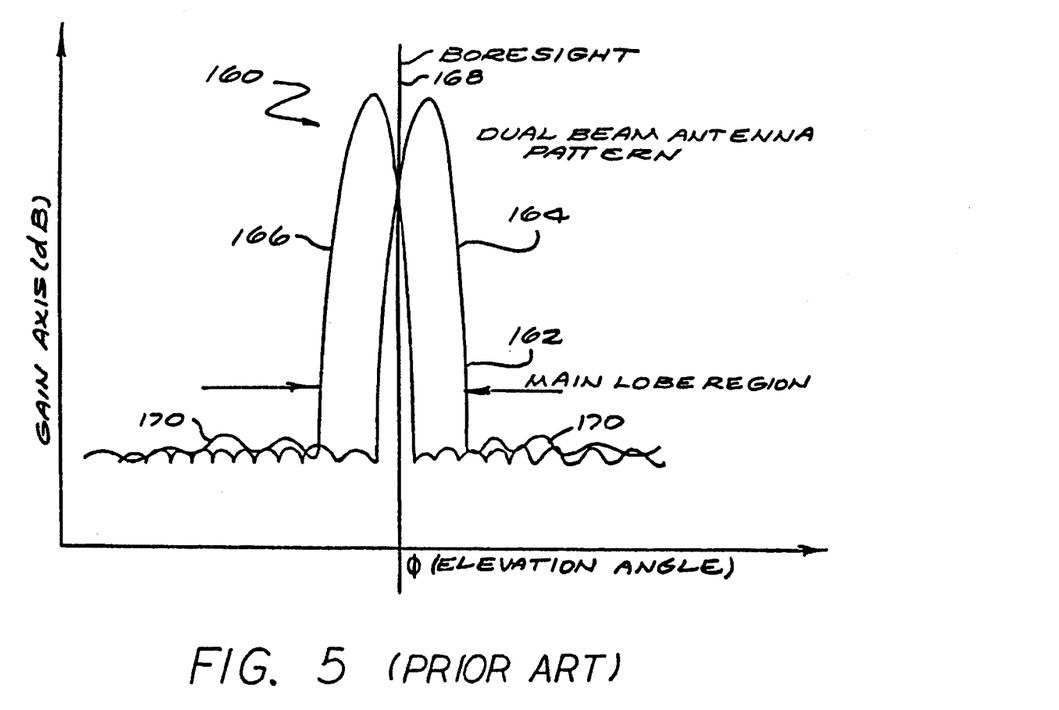
FIG. 5 is a graphical representation of a dual beam antenna pattern of the prior art.

A second example includes a dual beam antenna pattern 160 as shown in FIG. 5. The dual beam antenna pattern 160 is also graphically illustrated having a vertical gain axis measured in decibels (dB) and a horizontal coordinate axis measuring the elevation angle $\phi$. The antenna pattern 160 includes a main lobe region 162 comprised of a pair of beams 164, 166 having a boresight 168 passing therebetween. Notice that the boresight 168 is in the vicinity of the maximum gain of the pair of main lobe beams 164, 166. Since the boresight 168 does not pass through the maximum gain point as in the single beam antenna pattern 150, the condition existing in the dual beam antenna pattern 160 is referred to as off-boresight. A side lobe region 170 is illustrated adjacent to the pair of main lobe beams and is also comprised of a plurality of returned signals having spatial frequencies of varying harmonics.

Notwithstanding the systems developed in the past, there continues to be a recognized need for an improved radar tracking system having greater elevation angle coverage than is provided by a standard parabolic reflector and a corresponding greater amplification gain while simultaneously eliminating elevation angle ambiguities. Further, the improved radar system should achieve a cosecant-squared antenna pattern, permit the determination of the three dimensional position of the target T by the addition of the azimuth angle and range and be economical to manufacture in comparison with prior art height finding methods.

Figure 8:
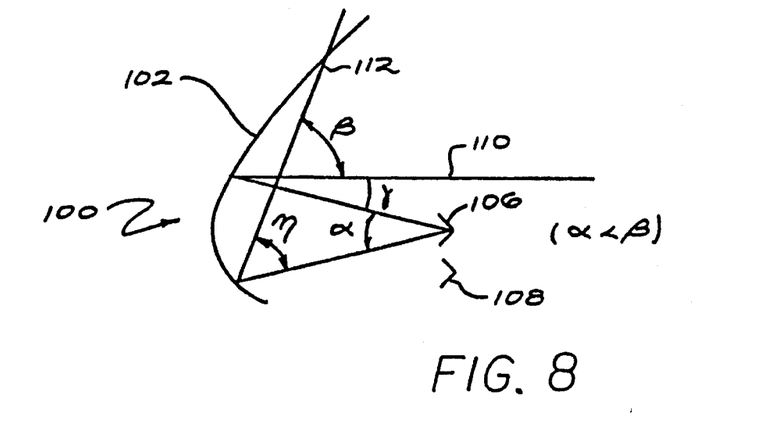
FIG. 8 is a planar view of a height finding radar system in accordance with the present invention.

In accordance with the present invention, the shaped reflector 102 and the pair of spaced feedhorns 106, 108 cooperate to increase the range of coverage of the elevation angle $\phi$ of the target 104 beyond the coverage of a system employing a standard parabolic reflector and to significantly increase the gain of the signals returned to the ground based radar system 100 over other radar systems employing only feedhorns for collecting the returned signals. This is accomplished while simultaneously eliminating elevation angle ambiguities. Further, the radar system incorporates a construction which approximates a cosecant-squared antenna pattern, permits the calculation of the target height and three-dimensional position and is economical to manufacture compared to radar systems of the past.

The first spaced feedhorn 106 directs energy from the transmitter 128 (shown in FIG. 6) to the shaped reflector 102 and outward to the target 104 in the ground based radar system 100 as is illustrated in FIG. 8. For illustration purposes only, received energy is shown reflected from the shaped reflector 102 and directed only to the first spaced feedhorn 106. Under normal conditions, received energy would also be reflected from the shaped reflector and directed to the second spaced feedhorn 108. The shape of the reflector 102 is employed for approximately achieving a cosecant-squared antenna pattern and will be described hereinafter. It should be noted that radar systems known in the past employed a shaped reflector approximating a cosecant-squared antenna pattern for tracking a target signal, however, the following described technique has not been previously employed for measuring the height of a tracked target.

The shaped reflector 102 has both a transmitting function and a receiving function. In the transmitting mode, the reflector 102 focuses energy received from the feedhorn 106 so that most of the transmitted energy is directed towards the horizon with a smaller portion being directed to those elevation angles addressed between (−5°) to (+25°). Under these conditions, the zero axis is usually close to the horizon because most radar facilities are usually located on a elevated plane. Therefore, the (−5°) position is with respect to the boresight and extends below the horizon.

Typically, the shape of the reflector 102 is such that the resulting antenna pattern is a cosecant-squared pattern. Although other reflector shapes may be employed, the reflector shape as illustrated in FIG. 8 provides a cosecant squared shape suitable for the example described herein. Therefore, in the receiving mode, energy reflected from the target 104 at elevation angles $\phi$ of interest is received by the shaped reflector 102 and directed toward the feedhorns 106, 108.

The first and second feedhorns 106, 108 are separated only by a few wavelengths of the received energy. The purpose of the dual feedhorns is to produce an antenna pattern which is a function of the elevation angle $\phi$. Therefore, the elevation angle $\phi$ of the tracked target can be determined by measuring the electrical phase angle and amplitude difference between the feedhorns. This is accomplished by measuring the electrical phase angle and amplitude difference of the energy received by the shaped reflector 102 from the returned signal reflected by the target. It should be noted that the electrical phase angle and amplitude difference measurement between the feedhorns 106, 108 of the received reflected energy can be measured in many ways well known in the art.

F or illustration purposes, the energy received between the first spaced feedhorn 106 and the shaped reflector 102 spans an angle $\alpha$. One extreme of the energy received from the vicinity of the horizon is reflected from approximately the center of the shaped reflector and directed toward the feedhorn 106 as is shown in FIG. 8. The other extreme of the energy received from the shaped reflector at the spaced feedhorn 106 is reflected at an angle $\eta$ which is larger than an angle $\gamma$.

Because of the curvature designed into the lower portion of the shaped reflector 102, the energy received as a second reflected signal 112 forms an angle β with the energy received as a first reflected signal 110. The angle β lies between the two extremes of the energy received from the first reflected signal 110 and the second reflected signal 112. It should be noted that the angle α is smaller than the angle β located between the deflected waves of received energy when the energy is received by or transmitted from the first spaced feedhorn 106. Therefore, since angle β is greater than angle α and the angle β represents the energy deflected from the shaped reflector 102, a greater range of elevation angle coverage is provided than from the coverage available from a standard parabolic reflector or from the feedhorns facing directly into the horizon.

The fourth angle γ is located between the angle α and the angle β. The angles γ and η are relevant in shaping the cosecant-squared beam and assist in achieving the extended elevation angle coverage. The angle γ must be smaller than the angle η for properly shaping the cosecant-squared pattern as the relationship between these angles is well known in the art.

The feedhorns 106, 108 are separated by only a few wavelengths of the returned signal energy which would normally cause elevation angle ambiguities over a reasonable range of space for a straight interferometer type of radar system. However, the presence of this shaped reflector 102 restricts the elevation angle φ as seen by the pair of feedhorns and permits the angle β region of space (for example 30°) to be translated into the much smaller angle α to avoid elevation angle ambiguities. The angle α, in turn, translates into two times 360° of electrical angle difference between the feedhorns. The first 360° of electrical angle difference between the feedhorns occurs for the angle β typically between (−5°) and (+5°) when the low beam amplitude is greater than the high beam amplitude in the region of the toe of the low beam while the second 360° of electrical phase angle difference between the feedhorns occurs for the angle β, typically between (−5°) and (+25°) when the low beam amplitude is less than the high beam amplitude as is clearly shown in FIGS. 9 and 10. This clearly illustrates that the curvature of the shaped reflector 102 does indeed present the feedhorns 106, 108 with an electromagnetic wavefront more nearly perpendicular than if the received energy had directly impinged on the feedhorns.

The characteristic phase and amplitude of the ground based radar system 100 with the two feedhorns 106, 108 will now be described. Under normal operating conditions, the feedhorn 106 transmits energy to be radiated to the shaped reflector 102 and also receives a returned signal therefrom. Because there are two feedhorns, there is correspondingly two reference curves representing the elevation angle in degrees plotted against the amplitude gain of the return signal in decibels. The two curves are represented by a high beam curve 200 and low beam curve 202 as is clearly indicated on the graphical illustration of FIG. 9. Each of the curves 200 and 202 represents the energy received from one of the feedhorns 106, 108. Since the feedhorns are displaced from one another by a few wavelengths of the received energy, the high beam curve 200 is correspondingly displaced from the low beam curve 202. In general, the low beam curve and the high beam curve each represent the returned energy which is directed at the shaped reflector 102. The amplitude of the returned signal received by each of the respective feedhorns is determined by the energy of the received signal collected by the shaped reflector and directed back to the feedhorns.

One of the novel features of the instant invention is that if the electrical phase angle difference between the high beam curve 200 and the low beam curve 202 is known as a function of the elevation angle of the received energy, the elevation angle and hence the height of the target may be determined. Therefore, in furtherance of the graphical analysis, the elevation angle φ in degrees is plotted against the electrical phase difference between the high beam curve and the low beam curve in degrees as is clearly illustrated in FIG. 10. The following discussion requires a close inspection of FIGS. 9 and 10 collectively. It should be noted that when the low beam return signal has a greater amplitude than the high beam return signal, there is a monotonic electrical phase change of 360° with a (typical) 10° elevation angle excursion. Similarly, when the high beam return signal has a greater amplitude, the electrical phase change is 360° for (typically) 20° of elevation angle change.

Figure 9:
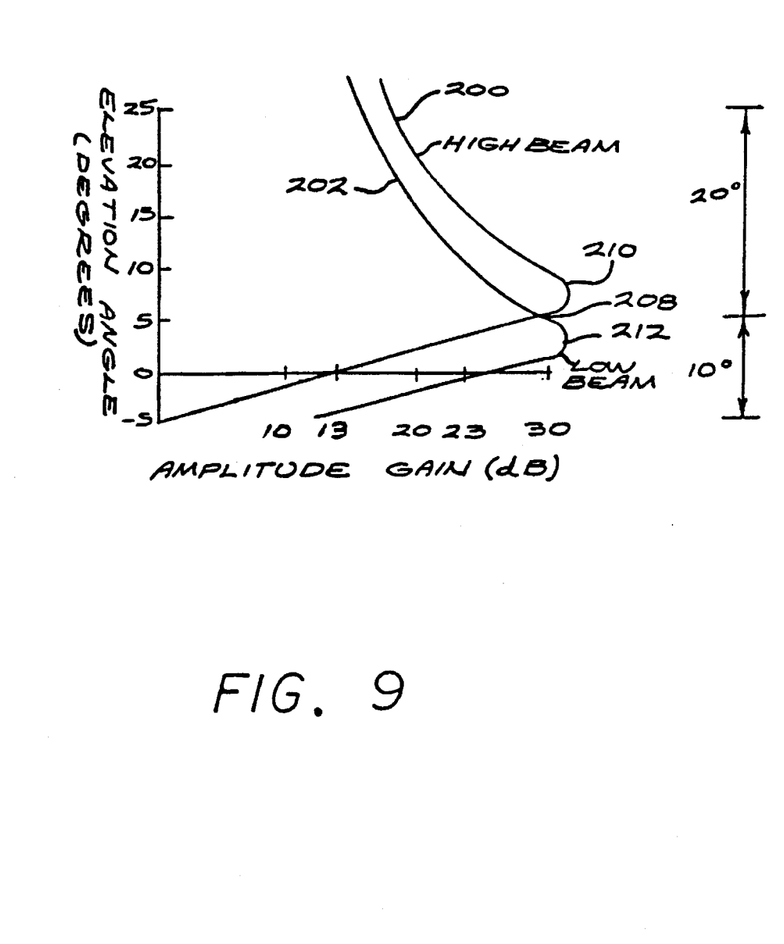
FIG. 9 is a graphical representation of the (received signal) amplitude gain (dB) versus elevation angle (degrees) for a high beam and a low beam.
Figure 10:
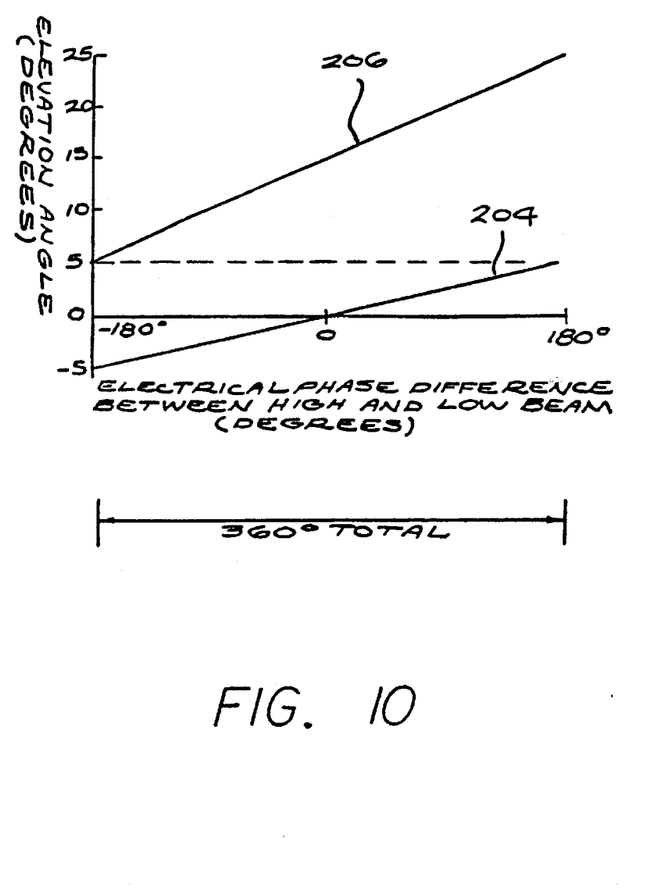
FIG. 10 is a graphical representation of the electrical phase difference between a high beam and a low beam (degrees) versus elevation angle (degrees).

By referring to the high beam curve 200 with respect to the low beam curve 202 as illustrated in FIGS. 9 and 10, it will be noted that the phase angle between the two electrical signals can have a total maximum value of 2 πradians or 360°. Thus, the electrical phase difference between the high and low beams may be shown with a linear curve 204 extending from (−180°) to (+180°) as is illustrated in FIG. 10. The 10° elevation angle excursion is indicated by the linear curve 204 ranging from the (−5°) elevation angle position to the (+5°) elevation angle position on the vertical axis of FIG. 10. Thus, the change in electrical phase from (−180°) to (+180°) is a function of the elevation angle φ of the target T.

Likewise, when the high beam return signal reaches a magnitude which is greater than the low beam return signal, the two curves cross as is illustrated in FIG. 9. Under these conditions, the electrical phase difference between the high and low beams may be shown by a second linear curve 206 as is illustrated in FIG. 10. As can be seen, the second linear curve 206 ranges from (−180°) to (+180°) for spanning the 360° electrical phase change. Further, the 20° of elevation angle change ranges from (+5°) to (+25°) elevation angle on the vertical axis as illustrated in FIG. 10. A crossover point 208 is defined as that point at which the high beam curve 200 intersects the low beam curve 202 on FIG. 9. It should be noted that the crossover point 208 lies along the (+5°) elevation angle position on the vertical axis and is defined as that point where the high beam return signal is equivalent to the low beam return signal in amplitude.

An example will serve to demonstrate the relationship between FIGS. 9 and 10. For a 0° elevation angle φ, the amplitude of the high beam return signal shown on FIG. 9 is approximately 13 decibels while the amplitude of the low beam return signal is approximately 23 decibels. These measurements indicate that the low beam return signal has a greater amplitude indicated by the difference of 10 decibels. Upon further inspection, it is noted that the amplitude of the low beam return signal is greater than the amplitude of the high beam return signal for elevation angles between (−5°) to (+5°) measured from the boresight of the antenna. In addition, for the case in which the returned signal is received at an elevation angle φ of 0°, the electrical phase difference is 0° as is shown in FIG. 10 (which would otherwise, have been measured). Thus, in comparing the low beam curve 202 to the high beam curve 200, the reading of the amplitude of the gain along the horizontal axis indicates the strength of the returned signal to the first and second feedhorns 106, 108 from two separate ranges of elevation angles.

By comparing the two curves in the elevation angle range of from (+5°) to (+25°), it is noted that the amplitude gain for the readings on the high beam curve 200 are consistently greater than the corresponding readings on the low beam curve 202. After the two curves intersect at the crossover point 208, the angles of elevation exceed (+5°) and the amplitude gain in decibels begins to become smaller as the elevation angle increases. This phenomenon is illustrated graphically at the point at which the character of each curve changes. That location on each curve is referred to as the toe of the curve and is illustrated as a high beam toe 210 and a low beam toe 212.

Thus, knowing the electrical phase angle between the high beam curve 200 and the low beam curve 202 from FIG. 10 (measured from the returned signals of a target 104 at an unknown elevation angle) and the amplitude relationship between the high beam curve and the low beam curve from FIG. 9 (measured from the returned signals of the same target), the elevation angle $\phi$ can be determined over the range of 30° of elevation as described in the foregoing example. By knowing the amplitude relationship between the high beam curve and the low beam curve in FIG. 9, the elevation angle of the returned signals may be determined by employing both FIGS. 9 and 10. The elevation angles of interest range from twenty-to-thirty degrees, (−5°) to (+25°), as shown in FIGS. 9 and 10 which is typical for a dual beam antenna. However, this method can be modified for determining the elevation angle of signals received from a tracked target at greater than 30° even though the previous example implied that elevation angles of greater than 30° were not of interest.

After the elevation angle $\phi$ of the tracked target is known, the azimuth angle $\theta$ (determined from rotation as shown in FIG. 2) and the range R may be combined with the elevation angle $\phi$ for determining the three dimensional position in space of the target T as shown in FIG. 7. It should be noted that dual beam antennas have been known in the past but have not been previously employed for measuring the elevation angle $\phi$ of a tracked target T. Originally, the dual beam antenna was designed for reducing the effects that extraneous objects in space (referred to as clutter) had on targets flying close to the horizon. The clutter tended to interfere with the transmission and the return of the radar signals.

Further, it should be noted that the dual beam antenna has not been optimized for use in measuring the elevation angle $\phi$. However, the method of measurement described herein could be utilized with existing or slightly modified dual beam antennas to measure height. In addition, once the elevation angle $\phi$ and the range R to the target are known, the target's height can be determined by employing either a flat earth or a round earth geometry. This simple geometry is illustrated in FIG. 6. With the addition of the azimuth angle $\theta$, the three dimensional position in space of the tracked target may be calculated.

In general, a closed form equation for the ground based radar system 100 employing the shaped-beam antenna pattern does not exist. The design of the antenna pattern was completed with the assistance of computer simulation in which a form of incremental analysis and empirical approximation w as utilized. Classical closed form equations describing the design of the antenna system disclosed herein have not been derived at this time, and thus have not been included.

The dichotomy that existed in radar systems of the past has been between the range of elevation angle coverage and the amplitude gain of the returned signal. Thus, the coverage of the elevation angle $\phi$ was limited with a standard parabolic reflector which had a higher amplification gain of the returned signal. However, if the feedhorns of previous radar systems were the primary receiving elements, the amplification gain of the received signal was poor although the elevation angle coverage may have been greater. By combining the shaped reflector 102 with the closely spaced feedhorns 106, 108, a compromise is created in which the range of the elevation angle coverage is increased over the range previously available from a standard parabolic reflector.

Further, the combination of the shaped reflector and closely spaced feedhorns also provide an increased returned signal gain over similar types of prior radar antenna designs in which the feedhorns were the primary receiving elements (as in the earlier described interferometer method). In essence, the shaped reflector 102 permits attaining a higher amplification gain than if the feedhorns 106, 108 were utilized without the benefit of a reflector with the simultaneous increase in elevation angle coverage over that previously provided by a standard parabolic reflector. Also, the shaped reflector is useful in achieving the cosecant-squared antenna pattern.

Another advantage associated with the instant invention is that of solving a problem of the past which occurred when the feedhorns were positioned to face directly towards the horizon. Without a reflector to limit the size of the angle in which the returned signal could be received, the feedhorns could receive signals at the angle $\beta$. By its very nature, the angle $\beta$ was very large and included ambiguities. In particular, if the spacing "d" between the feedhorns was greater than $\lambda/2$, ambiguities would exist. Keep in mind that it is the electrical phase difference between the high beam curve 200 and the low beam curve 202 of FIG. 9 which is utilized to determine the elevation angle $\phi$ for a particular target. Therefore, an ambiguity is defined as the situation in which a particular electrical phase difference between the return signals may result from more than a single elevation angle. An example of this problem is shown by the fact that in the equation (3), $\Delta e$ can assume values only between $\pm \pi$ and that there are many combinations of $(d)$, $(\lambda)$ and $(\phi)$ which will provide the same value of $\Delta e$.

Ideally, a monotonic function is preferred which provides a unique and discrete value of a dependent variable for each single value of an independent variable. By employing the shaped reflector 102, a single value of the elevation angle $\phi$ will exist for each value of electrical phase difference between the high beam return signal and the low beam return signal received by the feedhorns. Even though the feedhorns 106, 108 are separated by a few wavelengths of received energy, the presence of the shaped reflector changes the angle $\beta$ into the angle $\alpha$ for eliminating the ambiguities. Under these conditions, when the angle $\alpha$ is substituted for the elevation angle $\phi$ in equation 3, a spacing "d" greater than $\lambda/2$ results in an electrical phase angle $\Delta e$ between the feedhorns of less than or equal to $\pi$. Thus, the shaped reflector must be designed with the constraint that the angle $\alpha$ is less than the angle $\beta$ and that spacings "d" greater than $\lambda/2$ result in a phase angle of less than or equal to $\pi$. This is accomplished by the geometry of the shaped reflector and the spacing of the feedhorns. Therefore, in addition to the advantages recited over the radar systems of the past, the shaped reflector provides a simplified means of solving ambiguity problems resulting in an economic construction.

It should be noted that alternative embodiments of the present invention have been considered and include employing the present invention as an airborne radar system for tracking targets located on the ground. The airborne radar system would operate in the reverse mode as compared to the ground based radar system 100. Airborne feedhorns would provide energy to be radiated by an airborne shaped reflector which would transmit radiated energy to tracked targets on the ground.

Signals returned from tracked targets on the ground would be collected by the airborne shaped reflector and delivered to the feedhorns for processing. Assuming the existence of a pair of feedhorns separated by only a few wavelengths of the received energy, a pair of curves such as the high beam curve and the low beam curve appearing on FIG. 9 could be plotted against the elevation angle in degrees. In similar form, the relationship between the curves of the returned signals could be mapped into linear curves representing elevation angle plotted against the electrical phase difference of the returned signals. Then the elevation angle of the tracked target on the ground could be determined and employed for determining a three-dimensional position.

From the foregoing, it will be appreciated that the radar system of the present invention permits the shaped reflector 102 in combination with the pair of spaced feedhorns 106, 108 to collect signals returned from the target 104 increasing the range of coverage of the target elevation angle φ and significantly improving the amplified gain of the returned signals while simultaneously eliminating elevation angle ambiguities thereby permitting the targets to be tracked at large elevation angles. Further, the radar system employs a construction which approximates a cosecant-squared antenna pattern, eliminates elevation angle ambiguities, and is economical to manufacture compared to three dimensional radar systems of the past. Since large elevation angles φ may be measured, the heights and the three-dimensional positions of targets previously ignored by single or dual beam two dimensional radar antennas may now be tracked.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A dual beam radar system comprising, in combination:

means for generating a plurality of signals;

means for feeding said plurality of signals, said feeding means in electronic communication with said signal generating means for providing an antenna pattern dependent upon an elevation angle of a tracked target;

means for reflecting a plurality of radiated energy received from said feeding means, said reflecting means being asymmetrical in shape for focusing and directing said energy to said target and for receiving a plurality of returned signals from said target, said reflecting means providing a cosecant-squared antenna pattern; and means for measuring an electrical phase angle difference between said plurality of returned signals, said phase angle difference for determining said elevation angle of said target, said asymmeterical reflecting means and said feeding means for providing a greater range of elevation angle coverage of said target by reflecting said radiated energy at larger angles and by restricting said plurality of return signals directed to said feeding mean to smaller angles wherein a large angular region of said return signals is translated into a small angular region of said return signals for eliminating ambiguities in said elevation angle and for providing an increased return signal gain and a unique value of elevation angle for discrete value of said phase angle difference wherein said unique value of said elevation angle permits determining the height of said target.

2. The dual beam radar system of claim 1 wherein said signal generating means comprises a radiation signal source.

3. The dual beam radar system of claim 1 wherein said feeding means comprises a plurality of spaced feedhorns.

4. The dual beam radar system of claim 1 wherein said unique value of elevation angle provided for each discrete value of said measured electrical phase angle difference provides for the elimination of ambiguities in said elevation angle.

5. The dual beam radar system of claim 1 wherein a first of said plurality of returned signals is a high beam returned signal.

6. The dual beam radar system of claim 1 wherein a second of said plurality of returned signals is a low beam returned signal.

7. The dual beam radar system of claim wherein the amplitudes of each of said plurality of returned signals are compared for determining the application of said electrical phase angle difference to said returned signals for determining said elevation angle of said target.

8. The dual beam radar system of claim 1 wherein a first of said plurality of returned signals is plotted on a high beam curve and a second of said plurality of returned signals is plotted on a low beam curve, said high beam curve intersecting said low beam curve at a crossover point, said crossover point for determining the boundaries in the measurement of said elevation angle.

9. A height-finding dual beam radar system comprising, in combination:

means for generating a plurality of signals;

a plurality of spaced feedhorns in electronic communication with said signal generating means for providing an antenna pattern dependent upon an elevation angle of a tracked target;

an asymmetrically-shaped reflector for focusing a plurality of radiated energy received from each of said feedhorns and directing said energy to said target and for receiving a plurality of return signals from said target, said asymmetrically shaped reflector providing a cosecant-squared antenna pattern; and means for measuring an electrical phase angle difference between said plurality of return signals, said phase angle difference for determining said elevation angle of said target, said asymmetrically-shaped reflector and said feedhorns for providing a greater range of elevation angle coverage of said target by reflecting said radiated energy at larger angles and by restricting said plurality of return signals directed to said plurality of feedhorns to smaller angles wherein a large angular region of said return signals is translated into a smaller angular region said return signals for eliminating ambiguities in said elevation angle and for providing an increased return signal gain and a unique value of elevation angle for each discrete value of said phase angle difference wherein said unique value of said elevation angle permits determining the height of said target.

10. The dual beam radar system of claim 1 wherein said plurality of spaced feedhorns are separated by at least a wavelength of said radiated energy.

11. A method for determining an elevation angle of a tracked target from a dual beam radar system, said method comprising the steps of:

providing a radiating source for generating a plurality of signals;

providing a plurality of spaced feedhorns in communication with said radiating source for creating an antenna pattern dependent upon said elevation angle of said target;

focusing a plurality of radiated energy received from each of said feedhorns onto an asymmetrically-shaped reflector for directing said radiated energy to said target;

directing a plurality of target return signals received by said asymmetrically-shaped reflector to said plurality of feedhorns for providing said return signals to said radar system for electrical phase comparison; and measuring an electrical phase angle difference between said plurality of return signals for determining said elevation angle of said target, said asymmetrically-shaped reflector and said feedhorns for providing a greater range of elevation angle coverage of said target by reflecting said radiated energy at larger angles and by restricting said plurality of return signals directed to said plurality of feedhorns to smaller angles wherein a large angular region of said return signals is translated into a smaller angular region of said return signals for eliminating ambiguities in said elevation angle and for providing an increased return signal gain and a unique value of elevation angle for each discrete value of said phase angle difference wherein said unique value of said elevation angle permits determining the height of said target.

12. The method of claim 11 further including the step of comparing the amplitudes of each of said returned signals for assisting in determining said elevation angle subsequent to measuring said electrical phase angle.

13. The method of claim 11 further including the step of plotting a first of said returned signals on a high beam curve and plotting a second of said returned signals on a low beam curve wherein said high beam curve intersects said low beam curve at a crossover point, said crossover point for determining the boundaries for measuring said elevation angle.

14. The method of claim 13 further including the step of mapping a plurality of data from said low beam curve into a first linear curve representing 360° of said electrical phase angle difference between said returned signals over a first range of elevation angles.

15. The method of claim 13 further including the step of mapping a plurality of data from said high beam curve into a second linear curve representing 360° of said electrical phase angle difference between said returned signals over a second range of elevation angles.

16. The method of claim 11 further including the step of determining said elevation angle by graphically locating said electrical phase angle difference on one of a plurality of linear curves and identifying said elevation angle on a coordinate axis.

17. The method of claim 11 further including the step of separating said plurality of feedhorns by at least a wavelength of said radiated energy.

* * * * *